United States Patent
Liao et al.

(10) Patent No.: US 9,663,617 B2
(45) Date of Patent: May 30, 2017

(54) FLUORINE-CONTAINING MODIFIED BISMALEIMIDE RESIN

(71) Applicant: NAN YA PLASTICS CORPORATION, Taipei (TW)

(72) Inventors: Te-Chao Liao, Taipei (TW); Dein-Run Fung, Taipei (TW); Cheng-Li Chao, Taipei (TW); Hao-Sheng Chen, Taipei (TW); Yung-Sheng Wang, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 59 days.

(21) Appl. No.: 14/958,065

(22) Filed: Dec. 3, 2015

(65) Prior Publication Data

US 2016/0168330 A1      Jun. 16, 2016

(30) Foreign Application Priority Data

Dec. 11, 2014    (TW) .............................. 103143216 A

(51) Int. Cl.
*C08G 73/12*       (2006.01)

(52) U.S. Cl.
CPC .......... *C08G 73/128* (2013.01); *C08G 73/121* (2013.01); *C08G 73/123* (2013.01); *C08G 73/126* (2013.01); *C08G 73/127* (2013.01)

(58) Field of Classification Search
USPC .................................................. 528/170, 318
See application file for complete search history.

(56) References Cited

U.S. PATENT DOCUMENTS 6,077,928 A * 6/2000 Suh .................... C07D 207/444
                                                         528/170

\* cited by examiner

*Primary Examiner* — Edward Cain
(74) *Attorney, Agent, or Firm* — Bacon & Thomas, PLLC

(57) ABSTRACT

A modified bismaleimide resin is made by modify bismaleimide with aromatic diamine that contains fluoro substituents through chain-growth polymerization; and modified bismaleimide resin is excellent in physical properties including a low dielectric constant Dk (3 GHz) less than 3.0, a dissipation factors (3 GHz) less than 0.02, a low resin water absorptivity ranging from 0.21% to 0.33% and an excellent processability, and is particularly suited for producing a copper clad laminate that is required to have dielectric constant Dk (3 GHz) less than 3.

8 Claims, No Drawings

FLUORINE-CONTAINING MODIFIED BISMALEIMIDE RESIN

BACKGROUND OF THE INVENTION

1. Technical Field

The present invention relates to bismaleimide resin, and more particularly to a modified with an aromatic diamine containing fluoro substituents (hereinafter referred to as the fluorine-containing modified bismaleimide resin).

2. Description of Related Art

Bismaleimide (BMI) is a dual-function compound with maleimide as the end group and is a thermosetting resin reacting with various compounds. Bismaleimide is structurally compact and firm as well as has excellent physical and dielectric properties, such as high thermal stability, good mechanical properties, high glass transition temperature (Tg) and great toughness, making it a good material for heat resistant circuit boards, copper clad laminates (CCL) or resin coated copper (RCC).

However, traditional bismaleimide resin is relatively less tenacious and thus brittle. In addition, it is less soluble in solvents, and has high dielectric constant Dk and high water absorption. Also, its processability is poor.

For improving the traditional bismaleimide resin in these aspects, modification is necessary. For example, both U.S. Pat. Nos. 5,071,947 and 5,025,079 propose modifying bismaleimide resin with diamine monomer. The modified bismaleimide resin made by polymerizing bismaleimide and aromatic diamine does have significantly improved tenacity and solvent solubility. Nevertheless, since according to these known approaches aromatic diamine used for modification does not contain any fluoro substituents, the products as modified bismaleimide resin still has its dielectric constant Dk and water absorption relatively high.

SUMMARY OF THE INVENTION

In view of those drawbacks mentioned above, the primary objective of the present invention is to provide a fluorine-containing modified bismaleimide resin, which is made from an aromatic diamine containing fluoro substituents and a bismaleimide through an organic reaction of so-called Michael addition. This modification extends the main chain of bismaleimide and endows the resultant fluorine-containing modified bismaleimide resin with improved properties, including better solvent solubility, low dielectric constant Dk and low dissipation factor Df, low water absorption (or water absorbability), and excellent processability.

The fluorine-containing modified bismaleimide resin of the present invention is a thermosetting bismaleimide resin that contains a larger amount of non-polar and hydrophobic groups. It has lower brittleness, higher tenacity, higher thermal resistance and higher solvent solubility. In addition, the fluorine-containing modified bismaleimide resin contains fluorine atoms that have strong electron negativity and are unlikely to get polarized in electric fields, so that the fluorine-containing modified bismaleimide resin has a low dielectric constant Dk (3 GHz) less than 3.0 and/or a low dissipation factors Df (3 GHz) less than 0.02, respectively. Besides, since fluorine atoms are hydrophobic in nature, the resultant resin has reduced resin water absorptivity, as low as 0.21%-0.33%.

The disclosed fluorine-containing modified bismaleimide resin, when compared to modified bismaleimide resins without fluorine atoms, has the following beneficial features:

1. It has improved brittleness, enhanced tenacity, enhanced thermal resistance and increased dissolution rate in solvents;
2. It is suitable for copper clad laminate that is required to have dielectric constant Dk (3 GHz) less than 3.0; and
3. It is versatile, and when mixed with other resins and cured, still possesses high glass transition temperature (Tg), an even lower dielectric constant Dk and low dissipation factor Df as well as even lower water absorption.

DETAILED DESCRIPTION OF THE INVENTION

The disclosed fluorine-containing modified bismaleimide resin is made from an aromatic diamine containing fluoro substituents and a bismaleimide through an organic reaction of so-called Michael addition to extend the main chain of bismaleimide and thereby modify bismaleimide.

The disclosed fluorine-containing modified bismaleimide resin is of the following structural formula (I):

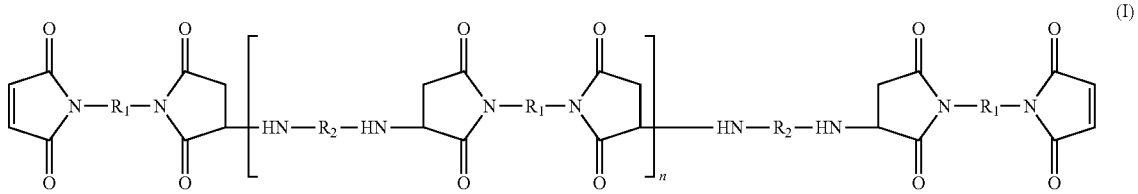

where n is a positive integer greater than or equal to 1 and smaller than 10;

R1 is selected from one or more from the group consisting of a diphenyl methane group, a diphenyl ether group, a diphenyl ether propane group, a phenyl group and a 3,3'-dimethyl-5,5'-diether-diphenyl methane group, and is of the following structural formula:

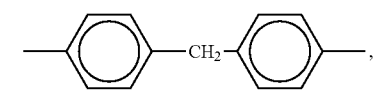

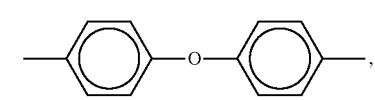

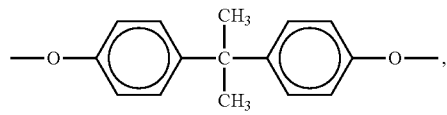

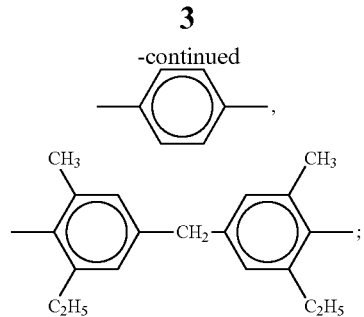

R2 is selected from one or more from the group consisting of a diphenyl hexafluoropropane group; a bis(trifluoromethyl) biphenyl group; a 4,4,-(phenoxy)phenyl-hexafluoropropane group and octafluorobiphenyl group, hereinafter referred to as fluorine-containing an aromatic group; and is of the following structural formula:

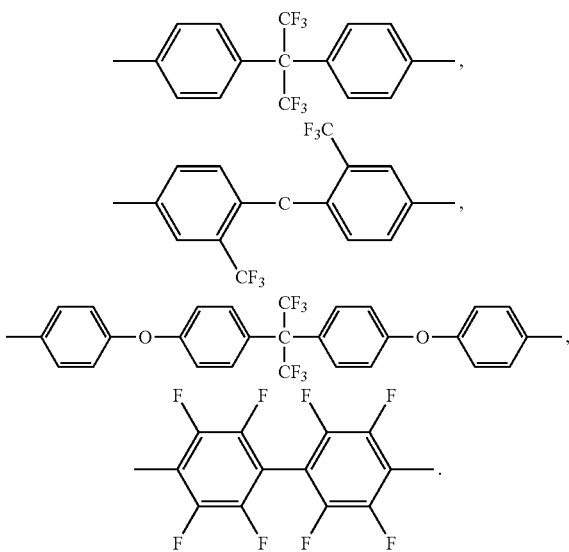

The disclosed fluorine-containing modified bismaleimide resin is made by modifying bismaleimide with the foregoing diamine having a fluorine-containing aromatic group (hereinafter referred to as fluorine-containing aromatic diamine), and thus possesses a high glass transition temperature (Tg) that is greater than or equal to 255° C., a low dielectric constant Dk (3 GHz) less than 3.0, a low dissipation factor Df (3 GHz) less than 0.02, and a water absorptivity of 0.21%-0.33%. Preferably, it has a dielectric constant Dk (3 GHz) less than 2.9, a dissipation factor Df (3 GHz) less than 0.018, a water absorptivity of 0.21%-0.33%, and a dissolution rate to solvents of 50 wt %-70 wt %. Therefore, the disclosed fluorine-containing modified bismaleimide resin is suitable for copper clad laminate that is required to have a dielectric constant Dk (3 GHz) less than 3.0.

A process for producing the disclosed fluorine-containing modified bismaleimide resin of the present invention is conducted to contain a synthesis process and a purification process, which comprises the following steps a)-g), wherein said synthesis process is proceeded at steps a)-e) and said purification process is proceeded at steps f)-g):

a) preparing a reaction vessel containing therein a mixer;
b) selecting bismaleimides and fluorine-containing aromatic diamines as starting materials having a molar ratio of the bismaleimide to the fluorine-containing aromatic diamine equal to 2:1-10:1, preferably 2:1-4:1;
wherein the bismaleimide may further include a modified bismaleimide;
c) forming a reaction solution in the reaction vessel by mixing the selected bismaleimide resin and fluorine-containing aromatic diamine with a reaction solvent and a retarding agent optionally added to reduce the level of said starting materials of step b) dissolved in said reaction solvent;
wherein the reaction solution has solid content of 10 wt %-60 wt %, preferably 40 wt %-60 wt %;
d) adding a catalyst by dropwise into the reaction solution of step c), introducing nitrogen gas into the reaction vessel to expel air and moisture from the reaction vessel, and simultaneously activating the mixer for agitation to distribute the catalyst evenly over the reaction solution;
wherein the catalyst is added at an amount equal to 0.1 wt %-2.0 wt %, preferably 0.1 wt %-1.0 wt %, by weight of the selected bismaleimide resin of step b);
e) obtaining a viscous synthetic resin solution by letting the reaction solution undergo a synthesis reaction under atmospheric pressure, at an reacted temperature ranging from 80° C. to 120° C., preferably, at an reacted temperature of 90-110° C., and for a reaction duration ranging from 8 to 30 hours;
f) separating out a primary resin grain or solution, through slowly adding deionized water at temperature of 45° C. into the reaction vessel if the viscous synthetic resin solution of step e) completely cooled to 60° C., and then activating the mixer again for agitation for 1-1.5 hours;
wherein the deionized water is added at an amount equal to 1.6-2 times of the synthesis resin solution of step e); and
g) processing the primary resin grain or solution of step f) via extracting out unreacted monomers and acid residues therefrom to obtain fluorine-containing modified bismaleimide resin grains or solutions of the present invention.

The bismaleimide resin for use in step b) is one or a mixture of more selected from the group consisting of 4,4'-diaminodiphenyl methane bismaleimide (BDM), 4,4'-diaminodiphenyl ether bismaleimide, 3,3'-dimethyl-5,5'-diethyl-4,4'-diphenylmethane bismaleimide, bisphenol A diphenyl ether bismaleimide, and 1,3-phenylene bismaleimide.

The modified bismaleimide for use in step b) is one or mixture of more selected from a group consisting of modified N,N'-4,4'-diphenylmethane bismaleimide, modified 4,4'-diaminodiphenyl ether bismaleimide, modified 3,3'-dimethyl-5,5'-diethyl-4,4'-diphenylmethane bismaleimide, modified bisphenol A diphenyl ether bismaleimide, and modified N,N'-1,3-phenylene bismaleimide.

The fluorine-containing aromatic diamine for use in step b) is one or mixture of more selected from the group consisting of 2,2-bis(4-aminobenzene)-hexafluoropropane, 4,4'-diamino-2,2'-bis(trifluoromethyl)benzidine, 2,2-bis[4-(4-aminophenoxy)phenyl]-hexafluoropropane and 4,4'-diaminooctafluorobiphenyl.

The reaction solvent for use in step c) is one or mixture of more selected from the group consisting of N,N-dimethylacetamide (DMAC), N,N-dimethylformamide (DMF) and N-methyl-2-pyrrolidone (NMP).

The retarding agent for use in step c) is one or mixture of more selected from a group consisting of hydroquinone (or called benzene-1,4-diol), hydroquinone monomethyl ether and dibutyl hydroxy toluene. The retarding agent is added at an amount equal to 0.05 wt %-0.5 wt % by weight of the selected bismaleimide resin of step b), preferably 0.05 wt %-0.2 wt %.

The catalyst for use in step d) is one or more selected from the group consisting of acetic acid, formic acid and solid acid (sulfonated resin).

EMBODIMENTS AND COMPARATIVE EMBODIMENTS

For further explaining the characteristics of the disclosed fluorine-containing modified bismaleimide resin, Fluorine-Containing Modified Bismaleimide Resins abbreviated as from BMI-A to BMI-I were respectively made in from Example 1 to Example 9 by using Samples of from BMI-a to BMI-e of Table 1 as the sources of bismaleimide, and Samples of from DA-F1 to DA-F4 of Table 2 as the sources of fluorine-containing aromatic diamine, and performing the process for producing fluorine-containing modified bismaleimide resins as disclosed in the present invention of which includes the synthesis process and the purification process.

On the other hand, Fluorine-Free Modified Bismaleimide Resins BMI-J and BMI-K were made in Comparative Examples 1-2, each produced by using aromatic diamine of Samples DA-N1 or DA-N2 of Table 3 to modify the bismaleimide obtained from Sample BMI-a.

TABLE 1

Sources of Bismaleimide

| Sample | bismaleimide (BMI) |
|---|---|
| BMI-a | 4,4'-diaminodiphenyl methane bismaleimide (BDM) |
| BMI-b | 4,4'-diaminodiphenyl ether bismaleimide |
| BMI-c | 3,3'-dimethyl-5,5'-diethyl-4,4'-diphenylmethane bismaleimide |
| BMI-d | bisphenol A diphenyl ether bismaleimide |
| BMI-e | 1,3-phenylene bismaleimide |

TABLE 2

Sources of Fluorine-Containing Aromatic Diamine

| Sample | Fluorine-Containing Aromatic Diamine | Structural Formulas of Fluorine-Containing Aromatic Groups |
|---|---|---|
| DA-F1 | 2,2-bis(4-aminodiphenyl)-hexafluoropropane | diphenyl hexafluoropropane group |
| DA-F2 | 4,4'-diamino-2,2'-bis(trifluoromethyl)biphenyl | bis(trifluoromethyl) biphenyl group |
| DA-F3 | 2,2-bis[4-(4-aminophenoxy)-phenyl]hexafluoropropane | 4,4'-(phenoxy)phenyl-hexafluoropropane group |
| DA-F4 | 4,4'-diaminooctafluorobiphenyl | octafluorobiphenyl group |

TABLE 3

Sources of Aromatic Diamine for Fluorine-Free Atoms

| Sample | aromatic diamine |
|---|---|
| DA-N1 | 4,4'-diamino diphenyl methane |
| DA-N2 | 4,4'-diamino diphenyl ether |

The fluorine-containing modified bismaleimide resins of Examples 1-9 and the fluorine-free modified bismaleimide resins of Comparative Examples 1-2 were then made into copper clad laminates, respectively. The copper clad laminates were later tested for their physical properties under the conditions stated below:

1. Glass Transition Temperature (° C.):

The samples were measured using Differential Scanning Calorimeter (DSC)TA2100.

2. Water Absorptivity (%):

The samples were heated in a pressure pot of 120° C. and 2 atm for 120 minutes and had their weight changes after heating recorded.

3. Dielectric Constant Dk (3 GHz):

The samples were measured for dielectric constant Dk using Dielectric Analyzer HP Agilent E4991A at frequency of 3 G Hz.

4. Dissipation Factor Df (3 GHz):

The samples were measured for dissipation factor Df using Dielectric Analyzer HP Agilent E4991A at frequency of 3 G Hz.

5. Molecular Weight:

A certain quantity of each of the modified bismaleimide resins was weighted and dissolved in the THF solvent to form a 1% solution. The solution was heated to clear and analyzed using Gel Permeation Chromatography (GPC) to calculate its characteristic peak area. The calibration curve used for determining the molecular weights of the samples was established based on the multi-point method with polystyrene standards having different molecular weights.

6. Solvent Solubility:

The synthesis resins were dissolved in DMF and DMAC solvents and had their dissolution rate measured and expressed in wt %.

Example 1

According to the synthesis formula and conditions listed in Table 4, following a molar ratio of 2:1, 107.4 g (or 0.3 mol) of Sample BMI-a was taken as the source of bismaleimide, whose physical properties before modification are as shown in Table 5; and 50.1 g (or 0.15 mol) of Sample DA-F1 was taken as the source of fluorine-containing aromatic diamine.

Sample BMI-a, Sample DA-F1, 157.5 g of N,N-dimethylacetamide (DMAC) and 0.15 g of benzene-1,4-diol (i.e., hydroquinone) were put into a four-neck round-bottom 500 ml reaction flask incorporating a mixer.

Nitrogen gas was introduced into the reaction flask to remove air and moisture. Under atmospheric pressure, the mixer was activated to run at 300 rpm to mix the reaction solution well and the reaction solution was preheated to 90° C.

When the reaction temperature reached 80° C., all the solid content of the reaction solution was dissolved into a red-brown clear solution. At this time, 0.2 g of acetic acid was added dropwise. The reaction was performed at 90° C. for 12 hours, so that the red-brown clear solution turned into dark red-brown viscous solution. Then in the purification process, pale yellow resin grains was separated from the red-brown solution, and impurities such as unreacted monomer and acid residue were removed therefrom, so as to obtain 140 g of yellow fluorine-containing modified bismaleimide resin grains (referred for short to as Resin BMI-A) with high purity.

The BMI-A resin was used to make a copper clad laminate, and the test results thereof are summarized in Table 6.

Example 2

The present example is similar to Example 1, with the difference that 108 g (or 0.3 mol) of Sample BMI-b was used as the source of bismaleimide instead, whose physical properties before modification are as shown in Table 5, and that 157.5 g of N,N-dimethylformamide (DMF) was used as the reaction solvent. The reaction was performed at 90° C. for 10 hours.

The product such obtained was 135 g of pale yellow fluorine-containing modified bismaleimide resin grains (referred for short to as Resin BMI-B). The resin was used to make a copper clad laminate, and the test results thereof are summarized in Table 6.

Example 3

The present example is similar to Example 1, with the difference that 88.4 g (or 0.2 mol) of Sample BMI-c was used as the source of bismaleimide instead, whose physical properties before modification are as shown in Table 5, and that 33.4 g (or 0.1 mol) of Sample DA-F1 was taken as the source of fluorine-containing aromatic diamine, thereby maintain a molar ratio of 2:1.

The reaction solvent used herein was 81.2 g of N,N-dimethylacetamide (DMAC), and the retarding agent was 0.12 g of hydroquinone. The reaction was performed at 100° C. for 25 hours. The obtained 103 g of pale yellow fluorine-containing modified bismaleimide resin grains (referred for short to as Resin BMI-C) was used to make a copper clad laminate, and the test results thereof are summarized in Table 6.

Example 4

The present example is similar to Example 1, with the difference that 110.8 g (or 0.2 mol) of Sample BMI-d was used as the source of bismaleimide instead, whose physical properties before modification are as shown in Table 5.

The reaction solvent used herein was 144.2 g of N-dimethyl pyrrolidone (NMF) and the catalyst was 0.15 g of formic acid. The reaction was performed at 100° C. for 21 hours.

The obtained 123 g of pale yellow fluorine-containing modified bismaleimide resin grains (referred for short to as Resin BMI-D) was used to make a copper clad laminate, and the test results thereof are summarized in Table 6.

Example 5

The present example is similar to Example 1, with the difference that the molar ratio was 3:1, while the source of bismaleimide was 107.4 g of (or 0.3 mol) Sample BMI-a, and the source of fluorine-containing aromatic diamine was 32.0 g of (or 0.1 mol) Sample DA-F2.

The reaction solvent was 140.8 g of N,N-dimethylacetamide (DMAC), and the retarding agent was 0.13 g of hydroquinone. The reaction was performed at 90° C. for 16 hours. The obtained 126 g pale yellow fluorine-containing modified bismaleimide resin grains (referred for short to as Resin BMI-E) were used to make a copper clad laminate, and the test results thereof are summarized in Table 6.

Example 6

The present example is similar to Example 1, with the difference that the molar ratio was changed to 3:1, while the source of bismaleimide was 107.4 g (or 0.3 mol) of Sample BMI-a, and the source of fluorine-containing aromatic diamine was 51.8 g (or 0.1 mol) Sample DA-F3.

The reaction solvent used herein was 130.3 g of N,N-dimethylformamide (DMF), and the retarding agent was 0.16 g of hydroquinone. The reaction was performed at 90° C. for 14 hours. The obtained 135 g pale yellow fluorine-containing modified bismaleimide resin grains (referred for short to as Resin BMI-F) were used to make a copper clad laminate, and the test results thereof are summarized in Table 6.

Example 7

The present example is similar to Example 1, with the difference that retarding agent was 0.16 g of hydroquinone and the catalyst was 1.05 g of solid acid (sulfonated resin). The reaction was performed at 95° C. for 14 hours.

The obtained 310 g of 50% red-brown fluorine-containing modified bismaleimide solution (referred for short to as Solution BMI-G) was used to make a copper clad laminate, and the test results thereof are summarized in Table 6.

Example 8

The present example is similar to Example 3, with the difference that catalyst was 0.88 g of solid acid (sulfonated resin). The reaction was performed at 100° C. for 27 hours.

The obtained 200 g of 50% red-brown fluorine-containing modified bismaleimide solution (referred for short to as Solution BMI-H) was used to make a copper clad laminate, and the test results thereof are summarized in Table 6.

Example 9

The present example is similar to Example 1, with the difference that the source of bismaleimide was 53.6 g (or 0.2 mol) Sample BMI-e, and the source of fluorine-containing aromatic diamine was 32.8 g (or 0.1 mol) Sample DA-F4.

The reaction solvent was 159.7 g of N,N-dimethylacetamide (DMAC), and the retarding agent was 0.09 g of hydroquinone while the catalyst was 0.15 g of acetic acid. The reaction was performed at 95° C. for 20 hours.

The obtained 68 g pale yellow fluorine-containing modified bismaleimide resin grains (referred for short to as Resin BMI-I) was used to make a copper clad laminate, and the test results thereof are summarized in Table 6.

Comparative Example 1

The present example is similar to Example 1, with the difference that the fluorine-free aromatic diamine Sample DA-N1 was used for synthesis.

The reaction solvent used herein was 137.1 g of N,N-dimethylformamide (DMF), the retarding agent was 0.14 g of hydroquinone. The reaction was performed at 90° C. for 10 hours. The obtained 120 g yellow fluorine-free modified bismaleimide resin grains (referred for short to as Resin BMI-J) were used to make a copper clad laminate, and the test results thereof are summarized in Table 6.

Comparative Example 2

The present example is similar to Comparative Example 1, with the difference that the fluorine-free aromatic diamine Sample DA-N2 was used for synthesis. The reaction was performed at 90° C. for 9 hours.

The obtained 122 g of yellow fluorine-free modified bismaleimide resin grains (referred for short to as Resin BMI-K) was used to make a copper clad laminate, and the test results thereof are summarized in Table 6.

TABLE 4

Synthesis Formulas and Synthesis Conditions of Modified Bismaleimide Resins

| Formula of Modified Bismaleimide | | Examples | | | | | | | | | Comparative Examples | |
|---|---|---|---|---|---|---|---|---|---|---|---|---|
| | | 1 BMI-A | 2 BMI-B | 3 BMI-C | 4 BMI-D | 5 BMI-E | 6 BMI-F | 7 BMI-G | 8 BMI-H | 9 BMI-I | 1 BMI-J | 2 BMI-K |
| BMI (g) | BMI-a[1] | 107.4 | — | — | — | 107.4 | 107.4 | 107.4 | — | — | 107.4 | 107.4 |
| | BMI-b[2] | — | 108 | — | — | — | — | — | — | — | — | — |
| | BMI-c[3] | — | — | 88.4 | — | — | — | — | 88.4 | — | — | — |
| | BMI-d[4] | — | — | — | 110.8 | — | — | — | — | — | — | — |
| | BMI-e[5] | — | — | — | — | — | — | — | — | 53.6 | — | — |
| Fluorine-Containing DA | DA-F1[6] | 50.1 | 50.1 | 33.4 | 33.4 | — | — | 50.1 | 33.4 | — | — | — |
| | DA-F2[7] | — | — | — | — | 32.0 | — | — | — | — | — | — |
| | DA-F3[8] | — | — | — | — | — | 51.8 | — | — | — | — | — |
| | DA-F4[9] | — | — | — | — | — | — | — | — | 32.8 | — | — |
| DA | DA-N1[10] | — | — | — | — | — | — | — | — | — | 29.7 | — |
| | DA-N2[11] | — | — | — | — | — | — | — | — | — | — | 30 |
| Reaction Solvent | DMAC | 157.5 | — | 81.2 | — | 140.8 | — | 157.5 | 81.2 | 159.7 | — | — |
| | NMP | — | — | — | 144.2 | — | — | — | — | — | — | — |
| | DMF | — | 157.5 | — | — | — | 130.3 | — | — | — | 137.1 | 137.4 |
| Retarding agent | benzene-1,4-diol | 0.15 | 0.15 | 0.12 | 0.15 | 0.13 | 0.16 | 0.16 | 0.12 | 0.09 | 0.14 | 0.14 |
| Catalyst | Acetic Acid | 0.2 | 0.2 | 0.2 | — | 0.2 | 0.2 | — | — | 0.15 | 0.2 | 0.2 |
| | Formic Acid | — | — | — | 0.15 | — | — | — | — | — | — | — |
| | Solid Acid | — | — | — | — | — | — | 1.05 | 0.88 | — | — | — |

TABLE 4-continued

Synthesis Formulas and Synthesis Conditions of Modified Bismaleimide Resins

| Formula of Modified Bismaleimide | | Examples | | | | | | | | | Comparative Examples | |
|---|---|---|---|---|---|---|---|---|---|---|---|---|
| | | 1 BMI-A | 2 BMI-B | 3 BMI-C | 4 BMI-D | 5 BMI-E | 6 BMI-F | 7 BMI-G | 8 BMI-H | 9 BMI-I | 1 BMI-J | 2 BMI-K |
| Reaction conditions | Pressure | 1 atm | 1 atm | 1 atm | 1 atm | 1 atm | 1 atm | 1 atm | 1 atm | 1 atm | 1 atm | 1 atm |
| | Temp. | 90° C. | 90° C. | 90° C. | 90° C. | 90° C. | 90° C. | 90° C. | 90° C. | 90° C. | 90° C. | 90° C. |
| | Time | 12 hrs | 10 hrs | 25 hrs | 21 hrs | 16 hrs | 14 hrs | 14 hrs | 27 hrs | 20 hrs | 10 hrs | 9 hrs |

Remark:
[1] BMI-a stands for 4,4'-diphenyl diamino methane bismaleimide;
[2] BMI-b stands for 4,4,-diphenyl ether bismaleimide;
[3] BMI-c stands for 3,3'-dimethyl-5,5'-diethyl-4,4'-diphenylmethane bismaleimide;
[4] BMI-d stands for bisphenol A diphenyl ether bismaleimide;
[5] BMI-e stands for 1,3-phenylene bismaleimide;
[6] DA-F1 stands for 2,2-bis(4-aminodiphenyl)hexafluoropropane;
[7] DA-F2 stands for 4,4'-diamino-2,2'-bis(trifluoromethyl)biphenyl;
[8] DA-F3 stands for 2,2-bis[4-(4-aminophenoxy)phenyl]hexafluoropropane;
[9] DA-F4 stands for 4,4'-diaminooctafluorobiphenyl;
[10] DA-N1 stands for 4,4'-diamino diphenyl methane
[11] DA-N2 stands for 4,4'-diamino diphenyl ether.

TABLE 5

Physical Properties of Bismaleimide Resin before Modification

| | Examples | | | | | |
|---|---|---|---|---|---|---|
| Bismaleimide | 1 BMI-a | 2 BMI-b | 3 BMI-c | 4 BMI-d | 5 BMI-a | 6 BMI-a |
| (Molecular Weight) | (358) | (360) | (442) | (554) | (358) | (358) |
| Dissolution Rate in Solvent[12] | 25% | 26% | 37% | 36% | 25% | 25% |
| Water Absorptivity (%) | 0.55 | 0.54 | 0.51 | 0.63 | 0.55 | 0.55 |
| Dk (3 GHz) | 3.45 | 3.42 | 3.07 | 2.87 | 3.45 | 3.45 |
| Df (3 GHz) | 0.027 | 0.025 | 0.017 | 0.020 | 0.027 | 0.027 |

| | Examples | | | Comparative Examples | |
|---|---|---|---|---|---|
| Bismaleimide | 7 BMI-a | 8 BMI-c | 9 BMI-e | 1 BMI-a | 2 BMI-a |
| (Molecular Weight) | (358) | (442) | (268) | (358) | (358) |
| Dissolution Rate in Solvent[12] | 25% | 37% | 13% | 25% | 25% |
| Water Absorptivity (%) | 0.55 | 0.51 | 0.52 | 0.55 | 0.55 |
| Dk (3 GHz) | 3.45 | 3.07 | 3.05 | 3.45 | 3.45 |
| Df (3 GHz) | 0.027 | 0.017 | 0.020 | 0.027 | 0.027 |

Remark:
[12] Dissolution rate of bismaleimide in DMF and DMAC solvents, expressed in wt %.

TABLE 6

Physical Properties of Bismaleimide Resin after Modification

| Physical Properties of Modified Bismaleimide | Examples | | | | | | | | | Comparative Examples | |
|---|---|---|---|---|---|---|---|---|---|---|---|
| | 1 BMI-A | 2 BMI-B | 3 BMI-C | 4 BMI-D | 5 BMI-E | 6 BMI-F | 7 BMI-G | 8 BMI-H | 9 BMI-I | 1 BMI-J | 2 BMI-K |
| (Molecular Weight) | 1,850 | 1,910 | 2,240 | 2,430 | 1,720 | 2,320 | 1,850 | 2,240 | 1,580 | 1,800 | 1840 |

TABLE 6-continued

Physical Properties of Bismaleimide Resin after Modification

| Physical Properties of Modified Bismaleimide | Examples | | | | | | | | | Comparative Examples | |
|---|---|---|---|---|---|---|---|---|---|---|---|
| | 1 BMI-A | 2 BMI-B | 3 BMI-C | 4 BMI-D | 5 BMI-E | 6 BMI-F | 7 BMI-G | 8 BMI-H | 9 BMI-I | 1 BMI-J | 2 BMI-K |
| Water Absorptivity (%) | 0.25 | 0.24 | 0.21 | 0.33 | 0.24 | 0.24 | 0.25 | 0.21 | 0.21 | 0.55 | 0.54 |
| Tg (° C.) | 257 | 260 | 255 | 255 | 263 | 260 | 257 | 257 | 255 | 255 | 257 |
| Dk (3 GHz) | 2.90 | 2.87 | 2.70 | 2.61 | 2.87 | 2.87 | 2.90 | 2.70 | 2.60 | 3.38 | 3.35 |
| Df (3 GHz) | 0.018 | 0.017 | 0.012 | 0.013 | 0.018 | 0.018 | 0.018 | 0.012 | 0.012 | 0.022 | 0.021 |
| Dissolution Rate in Solven[13] | 60% | 60% | 70% | 70% | 60% | 60% | — | — | 50% | 50% | 50% |
| Product grain | pale yellow | pale yellow | pale yellow | pale yellow | pale yellow | pale yellow | — | — | pale yellow | yellow | yellow |
| solution | — | — | — | — | — | — | red-brown | red-brown | — | — | — |

Remark:
[13]Dissolution rate of modified bismaleimide in DMF and DMAC solvents, expressed in wt %.

Results

1. According to Table 6, the fluorine-containing modified bismaleimide resins of Examples 1-9 all have glass transition temperature (Tg) greater than or equal to 255° C., low dielectric constant Dk (3 GHz) less than 3.0 and dissipation factor Df (3 GHz) less than 0.02, and thus are suitable for copper clad laminate that is required to have dielectric constant Dk (3 GHz) less than 3.0.

2. According to Table 6, the fluorine-free modified bismaleimide resins of Comparative Examples 1-2 have water absorptivity close to 0.55%. The fluorine-containing modified bismaleimide resins of Examples 1-9 have water absorptivity of 0.21%-0.33%, significantly lower than that of the fluorine-free modified bismaleimide resins of Comparative Examples 1-2.

Example 1 used the same bismaleimide resin as Comparative Examples 1 and 2, but after modified by the fluorine-containing aromatic diamine, the resin of Example 1 displays significantly reduced water absorptivity.

3. According to Table 6, the fluorine-free modified bismaleimide resin of Comparative Examples 1-2 both have dielectric constants (Dk) greater than 3.0 and dissipation factors (DO greater than 2.0. The fluorine-containing modified bismaleimide resins of Examples 1-9, on the other hand, have significantly better dielectric constant Dk (3 GHz) less than 3.0 and dissipation factors Df (3 GHz) less than 0.02, respectively.

4. According to Table 6, the fluorine-free modified bismaleimide resins of Comparative Examples 1-2 have dissolution rate in DMF and DMAC solvents of 50 wt %. The fluorine-containing modified bismaleimide resins of Examples 1-9 have dissolution rate in DMF and DMAC solvents improved to 50 wt %-70 wt %.

What is claimed is:

1. A fluorine-containing modified bismaleimide resin of structural formula (I), having a dielectric constant Dk (3 GHz) less than 3.0 and a dissipation factors (3 GHz) less than 0.02:

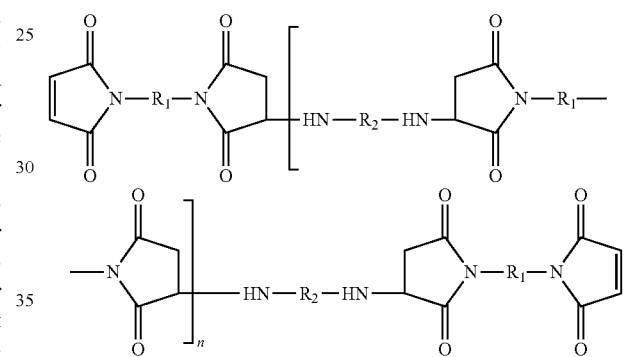

(I)

where n is a positive integer greater than or equal to 1 and less than 10;

R1 is selected from one or more from the group consisting of a diphenyl methane group, a diphenyl ether group, a diphenyl ether propane group, a phenyl group, and a 3,3'-dimethyl-5,5'-diether-A diphenyl methane group; and R2 is selected from one or more from the group consisting of a diphenyl hexafluoropropane group, a bis(trifluoromethyl) biphenyl group, a 4,4'-(phenoxy)phenylhexafluoropropane group and an octafluorobiphenyl group.

2. A process for producing the fluorine-containing modified bismaleimide resin of claim 1, comprising the following steps:

a) preparing a reaction vessel containing therein a mixer;

b) selecting bismaleimides and fluorine-containing aromatic diamines as starting materials with a molar ratio of the bismaleimides to the fluorine-containing aromatic diamines between 2:1 and 10:1;

wherein the bismaleimide resin is one or more selected from the group consisting of 4,4'-diaminodiphenyl methane bismaleimide, 4,4'-diaminodiphenyl ether bismaleimide, 3,3'-dimethyl-5,5'-diethyl-4,4'-diphenylmethane bismaleimide, bisphenol A diphenyl ether bismaleimide, 1,3-phenylene bismaleimide, modified N,N'-4,4'-diphenylmethane bismaleimide, modified 4,4'-diaminodiphenyl ether bismaleimide, modified 3,3'-dimethyl-5,5'-diethyl-4,4'-diphenylmethane bismaleimide, modified bisphenol A diphenyl ether bismaleimide, and modified N,N'-1,3-phenylene bismaleimide.

wherein the fluorine-containing aromatic diamine is one or more selected from the group consisting of 2,2-bis(4-aminobenzene)-hexafluoropropane; 4,4'-diamino-2,2'-bis(trifluoromethyl)benzidine; 2,2-bis[4-(4-aminophenoxy)phenyl]-hexafluoropropane and 4,4'-diaminooctafluorobiphenyl;

c) forming a reaction solution having solid contents of 10 wt %-60 wt % in the reaction vessel by mixing the selected bismaleimide resin and fluorine-containing aromatic diamine with a reaction solvent and a retarding agent;

wherein the reaction solvent is one or more selected from the group consisting of N,N-dimethylacetamide (DMAC), N,N-dimethylformamide (DMF) and N-methyl-2-pyrrolidone (NMP); and wherein the retarding agent is one or more selected from the group consisting of hydroquinone; hydroquinone monomethyl ether and dibutyl hydroxy toluene;

d) adding a catalyst by dropwise in an amount of 0.1 wt %-2.0 wt % by weight of the bismaleimide prepared of step b) into the reaction solution of step c), introducing nitrogen gas into the reaction vessel to expel air and moisture from the reaction vessel, and activating the mixer to distribute the catalyst evenly over the reaction solution;

wherein the catalyst is one or more selected from the group consisting of acetic acid, formic acid and solid acid;

e) obtaining a viscous synthetic resin solution by letting the reaction solution undergo a synthesis reaction under atmospheric pressure and reaction temperature of 80° C.-120° C. for from 8 to 30 hours; and f) separating out pale yellow resin grains or a red-brown resin solution from the viscous resin solution of Step e) and further extracting out unreacted monomers and acid residues therefrom to obtain pale yellow fluorine-containing modified bismaleimide resin grains or a red-brown fluorine-containing modified bismaleimide resin solution.

3. The process for producing the fluorine-containing modified bismaleimide resin of claim 2, wherein the starting materials of step b) is prepared with a molar ratio of the bismaleimides to the fluorine-containing aromatic diamines between 2:1 and 4:1.

4. The process for producing the fluorine-containing modified bismaleimide resin of claim 2, wherein the reaction solution prepared of step c) has the solid contents of 40 wt %-60 wt %.

5. The process for producing the fluorine-containing modified bismaleimide resin of claim 2, wherein the retarding agent is added at an amount equal to 0.05 wt %-0.5 wt % by weight of the selected bismaleimide resin of step b).

6. The process for producing the fluorine-containing modified bismaleimide resin of claim 2, wherein the retarding agent is added at an amount equal to 0.05 wt %-0.2 wt % by weight of the selected bismaleimide resin of step b).

7. The process for producing the fluorine-containing modified bismaleimide resin of claim 2, wherein the catalyst is added at an amount equal to 0.1 wt %-1.0 wt % by weight of the selected bismaleimide resin of step b).

8. The process for producing the fluorine-containing modified bismaleimide resin of claim 2, wherein the synthesis action of the reaction solution of Step e) is undergone at atmospheric pressure and reaction temperature of 90-110° C.

* * * * *